FREDERICK A. SEEDHOUSE
INVENTOR.

BY Frank C. Parker

ATTORNEY

United States Patent Office 3,437,404
Patented Apr. 8, 1969

3,437,404
ZOOM OBJECTIVE MOUNTING POD
Frederick A. Seedhouse, Henrietta, N.Y., assignor to Bausch & Lomb Incorporated, Rochester, N.Y., a corporation of New York
Filed Feb. 25, 1966, Ser. No. 530,069
Int. Cl. G02b 7/10
U.S. Cl. 350—255                     5 Claims

ABSTRACT OF THE DISCLOSURE

A self-contained, demountable pod for housing a zoom type of microscope objective is disclosed. The positions of the movable zoom lens mounting cells are controlled by cam followers attached to the cells which engage the respective surfaces of a cylindrical cam surrounding the body tube in which the lens cells are fitted. The zoom lens cells are urged against the cam surfaces by biasing springs seated against the ends of the tube carrying the lens cells.

The present invention relates to mounting mechanism for microscope objectives and more particularly it relates to an independently operated mechanical unit wherein a zoom type of objective is mounted.

Because of the advantages which zoom optical systems provide, the use of such systems in modern microscopes has become widespread, particularly in microscopes which are priced in the medium and upper cost ranges. Such zoom optical systems are usually built into the microscope body as a permanent part thereof and are not per se demountable therefrom. Although some low-cost student microscopes are equipped with zoom optical systems, these systems are necessarily inferior in quality and performance and are very limited in magnification range and furthermore such optical systems are not optionally interchangeable with fixed power micro-objectives.

In view of the above-mentioned facts, it is an object of the present invention to provide a demountable and completely self-contained operational mechanical unit for housing and operating a zoom type of variable power micro-objective.

It is a further object to provide such a device which is easily interchanged with conventional fixed power microscope objectives without the use of tools, the unit being economical to manufacture and uniformly easy to operate from any desired position by the operator.

A still further object is to provide such a device which is comparatively small, compact and rugged in construction, the operational forces within the unit being closely coupled and of low magnitude for reliable operation and long wear.

Further objects and advantages will be apparent in the combination and structure of the details of the invention from a study of the following specification accompanied by the drawing, wherein.

Figure 1:
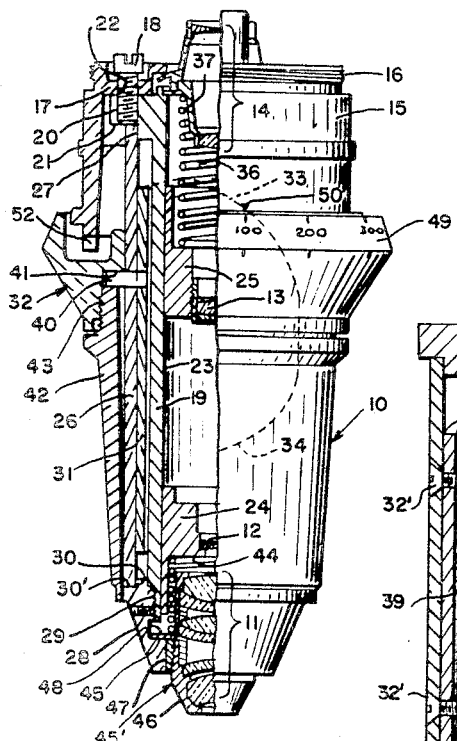
FIG. 1 is a side elevation of one form of the present invention, parts thereof being cut away and shown in section.

Referring first to FIG. 1 of the drawing, the aforesaid mechanical mounting unit for the zoom optical system is designated generally by the numeral 10. Mounted therein is a zoom optical system having a front stationary group of lenses 11 succeeded by two axially aligned movable zoom lenses 12 and 13 which, in turn, are followed by a second group of stationary relay lenses 14. The lens system here shown is not considered to be exclusive in form but is representative only of a favorable optical system for the purpose here intended. Therefore, alternate zoom optical systems may be incorporated in the mounting unit 10 having one or more movable zoom lenses.

According to the present invention as aforesaid, the mechanical mounting unit 10 is self-contained and is comprised of an adapter shell 15 having formed thereon a thread or other coupling device 16 which may be detachably fixed in a depending position to the sight tube of a microscope, not shown. The adapter shell 15 is provided with a transverse interior wall 17 at the top against which underlying parts are attached to the adapter shell 15.

Supported against the under surface of the adapter wall 17 is a main support tube 19 which is provided with an upper radial flange 20 having a radial surface 21 formed thereon. For uniting the flange 20 to the wall 17 a plurality of clearance holes 22 are provided in said flange through which extend the cap screws 18 so as to be threaded into the flange 20. On the interior of the main support tube 19 is formed a smooth bore 23 from end to end wherein the movable zoom lenses 12 and 13 are adapted to move. For this purpose, lower movable lens 12 is held in a lens cell 24 which is slidably fitted to the inner diameter 23 of the tube 19 and likewise the zoom lens 13 is held in an upper moveable lens cell 25 which is also slidably fitted to the bore 23.

Concentrically with but free of the body of the main support tube 19 is mounted a cam support tube 26. A rotational cylindrical bearing area or surface 27 is formed on the underside of the head portion 20 of tube 19 and said bearing surface 27 terminates against the radial surface 21 so that the cam support tube 26 is located rotationally and longitudinally by said surfaces. At the lower end of the cam support tube 26 is provided an annular retaining member 28 which is semi-permanently fixed on the lower end of the main support tube 19 as by means of a thread 29. The lower end of the cam support tube 26 bears on a cylindrical bearing surface 30 formed on the annular retaining member 28 and furthermore a radial surface 30' is formed on the member 28 contiguously to the cylindrical bearing area 30 so as to prevent longitudinal motion at that end of the tube.

Figure 5:
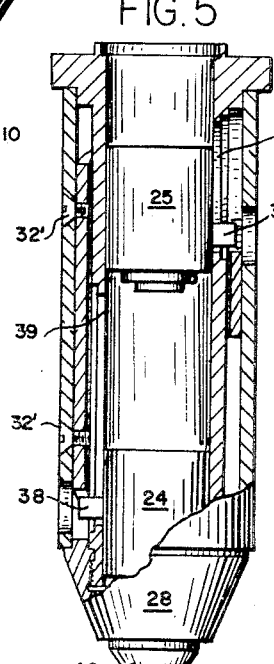
FIG. 5 is a midsectional view of certain operating parts of the invention indicating one condition of operation.
Figure 2:
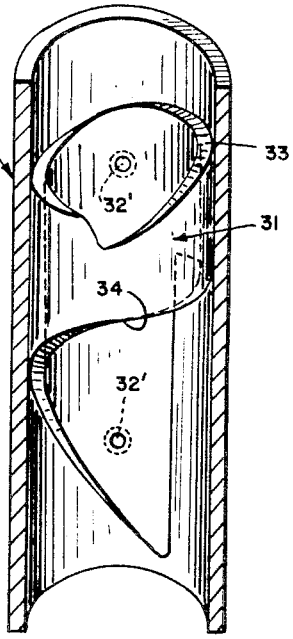
FIG. 2 is a perspective view of one of the operating parts of the invention shown partly in section.
Figure 3:
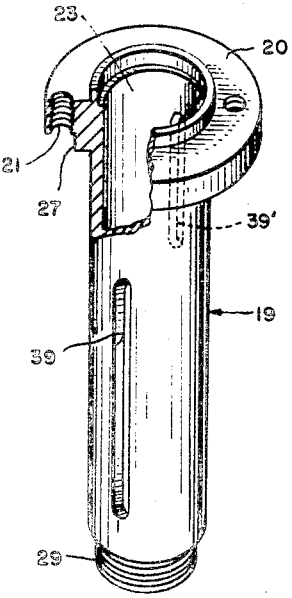
FIG. 3 is a perspective view of another operating part of the invention, certain parts thereof being broken away and shown in section.

It will be noted that the cam support tube 26 is spaced throughout its entire length away from the outer wall of the tube 19 except at its extreme ends, and in the intervening space is held a cam sleeve 31 which fits closely against the inner surface of the cam support tube 26 and is freely fitted around the main support tube 19 so as to be carried solely by the tube 26. The cam sleeve 31 is best represented in FIGS. 2 and 5 wherein at least one countersunk screw 32' is seated in the cam support tube and is threaded into the cam sleeve 31 so as to reliably immobilize the sleeve within the tube. In effect, the cam support tube 26 is the sole carrier of the cam sleeve 31 and furthermore reinforces the sleeve. One advantage that flows from such a construction is that the cam sleeve 31 need not be self-rigid or truly cylindrical in form per se. Therefore, it is a purpose of this invention to make said sleeve 31 by a molding process of low-cost plastic or similar materials whereon the cam surfaces are completely formed. By this construction, the cam member 31 may be replaced very quickly by another such cam member having somewhat different cam surface configuration to match modified lens structures. On the upper end of the cam sleeve 31 is formed a face cam surface 33 which is intended to move the upper movable lens 13 as explained hereinafter and correspondingly a cam surface 34 is formed on the lower end of the cam sleeve 31 for the purpose of moving the lower zoom lens 12.

In order to actuate the movable upper lens cell 25 in an upward direction along the bore 23, a cam follower pin 35 is fixed in the wall of the lens cell and it projects through the wall of the tube 19 and projects radially therebeyond far enough to lie in contact with the cam surface 33. To assure longitudinal movement of the movable lens cell 25 in the opposite direction, i.e., for the purpose of holding the pin against the cam surface 33, an expansion spring 36 is provided and it is seated at one end against the upper end of the lens cell as shown in FIG. 1. The other end of the spring 36 is seated under compressive stress against the wall of a composite lens cell 37 which, in turn, is suitably retained in the adapter shell 15 as shown in the wall 17. For a similar purpose, a cam follower pin 38 is firmly seated in the lower movable lens cell 24 and it projects through the wall of the tube 19 and projects therebeyond far enough to lie in contact with the lower cam surface 34.

In order to permit longitudinal motion of the lens cells 25 and 24 along the bore 23 while preventing relative rotation of the lens cells therein, a longitudinal opening or slot 39 is formed principally in the lower portion of the main support tube 19 wherein the cam follower pin 35 operates as shown best in FIG. 5 of the drawing. On the opposite side of the main support tube 19 near the upper end thereof is formed a shorter longitudinal slot 39' wherein the cam follower pin 38 operates.

Figure 4:
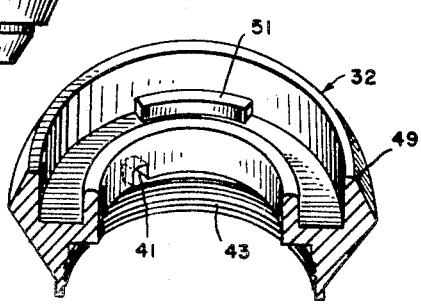
FIG. 4 is a perspective view of still another operating part of the invention shown partly in section.

For the purpose of rotating the actuating or cam support tube 26 on the main support tube 19, an actuating ring 32 is provided as best shown in FIGS. 1 and 4, said actuating ring being secured non-rotatably on the outer diameter of the cam support tube 26. In order to provide a non-rotational connection between the cam support tube and the actuating ring 32, a so-called roll pin 40 is secured in an opening in the sleeve 26 and it projects radially outwardly therebeyond so as to engage within an accommodating recess 41 formed on the inner surface of the ring 32. A second and complementary outer sleeve 42 is freely journaled around and on the outer diameter of the sleeve 26 and is fixed to the actuating ring 32 at its upper end by means of threads 43 in such a manner that the roll pin 40 is confined in the recess 41.

The aforesaid lens cell 24 is provided with a deep recess wherein an expansion spring 44 is seated at one end and said spring extends longitudinally of the recess to engage under compressive stress against a flange which is a part of a lens cell 45' wherein the stationary lens group 11 is mounted. Said lower lens cell 46 is provided with a cylindrical outer surface which engages slidably in a bore 47 formed in the annular retaining member 28 so that the lens group 11 may be moved upwardly in a yieldable manner. In order to longitudinally locate the flange 45 in the retaining member 28, a radial shoulder 48 is provided against which the radial flange 45 of the lens cell 46 is pressed by the spring 44.

On the actuating ring 32 is formed an appropriate scale 49 which cooperates with an index mark 50 formed on the adjacent adapter shell 15 so as to indicate the magnification at which the zoom optical system is set. It is necessary to limit the rotation of the actuating ring 32 and for this purpose an abutment lug 51 is formed on the interior surface of the ring 32 in such a position as to engage a protuberant lug 52 formed on the lower edge of the adapter shell 15.

With regard to the operation of the unit 10, it is first joined onto the microscope body section by engaging the thread 16 or other coupling device with corresponding and complementary fastening members which are on the microscope body. When it is desired to change the magnification of the zoom optical system, it is only necessary to rotate the actuating ring 32 whereby torque is transmitted through the roll pin 40 to the cam sleeve 31, whereupon the two cam follower pins 35 and 38 move along their respective cam surfaces 33 and 34 which results in the eventual motion of the lens cells 25 and 24.

It will be observed that the present invention as heretofore described provides the neat and effective mechanism for mounting a zoom optical system as a separately and independently operating part of a microscope, and furthermore it will be seen that the device is compact and sturdy and simple in form so that it may be serviced and adjusted with a minimum of effort and investment.

Although only a preferred form of the invention is shown and described in detail, other forms are possible and changes may be made in the specific structures and their cooperating embodiments without departing from the spirit of the invention as defined in the claims appended hereto.

I claim:

1. A self-contained unit for mounting a zoom type of microscope objective which includes two relatively movable lens components and a stationary lens component, said body having the combination of a main support tube, a cam support tube carried by said main support tube in spaced relation thereto, an enlarged head portion formed on the upper end of said main support tube, an enlarged annular retaining member fixed onto the lower end of said main support tube, a cylindrical bearing seat and a contiguous radial shoulder formed on said head portion and on said annular member whereon the opposite ends of said cam support tube are rotatably seated, a cam sleeve fixed to said cam support tube so as to rotate in the space between both tubes, said sleeve having a first and a second differential cam surface formed on the upper and lower edges respectively thereof, an upper and a lower zoom lens cell which are slidably fitted within said main support tube and wherein said movable lens components are held, an upper cam follower pin and a lower cam follower pin secured in the upper and lower zoom lens cells respectively and projecting radially through a pair of longitudinal slots formed in said main support tube and projecting therebeyond into engagement respectively with said first and second cam surfaces, and first and second spring means biased against said upper and lower zoom lens cells urging said cells toward each other whereby the respective cam follower pins are yieldably urged against the respective cam surfaces.

2. A self-contained unit for mounting a zoom type of microscope objective which includes two relatively movable lens components aligned between a front stationary lens component and a rear relay lens component, said body having the combination of a main support tube, an uppermost lens cell fixed in the upper end of said tube wherein said relay lens component is held, an upper and a lower movable lens cell slidably fitted into said tube wherein said two relatively movable lens components are held, an end cap surrounding the lower end of said tube and secured thereto, a lowermost stationary lens cell secured in the bottom of said end cap wherein said front stationary lens component is held in optical alignment with the other lenses, a cylindrical cam support tube positioned concentrically of and spaced from said main support tube, an enlarged head portion formed on the upper end of the main support tube, a cylindrical bearing seat formed on said head and on said end cap and fitted into the opposite ends of said cam support tube whereby it may rotate thereon, a cam sleeve fixed to said cam support tube in the space adjacent to said main support tube so as to turn with the cam support tube, an upper and a lower cam surface formed on the opposite ends of said cam sleeve, a first and a second cam follower pin which are fixed radially in said lower and upper movable lens cells respectively and extend through a pair of longitudinally elongated slots in said main support tube and bear at their outer ends against said upper and lower cam surfaces respectively, a first spring seated under expansive stress against said uppermost lens cell on one end and against the upper movable lens cell at the other end, and a second spring seated under expansive stress against the lower movable lens cell at one end and against the lowermost lens cell at the other end whereby the cam follower pins are biased against their respective cam surfaces whereon they move.

3. A self-contained unit for mounting a zoom type of microscope objective as set forth in claim 2 further characterized by said lowermost lens cell being slidably mounted in said end cap and projecting therebelow, and a stop shoulder formed in the lower portion of said end cap whereon said lowermost cell normally rests, whereby said second spring serves two purposes, i.e., to urge the cam follower pin for the lower movable lens cell against its respective cam and additionally urge the lowermost lens cell toward said stop shoulder when displaced from its normal position by abnormal operation.

4. A self-contained unit for mounting a zoom type of microscope objective as set forth in claim 3, said combination further being characterized by an adapter shell whereon coupling means is formed in cooperative relation to a part on said microscope, and means for fixing said main support tube onto the interior surface of said shell.

5. In a self-contained and independent mounting mechanism for a zoom type of microscope objective which includes two relatively movable lens cells, the combination of a main support tube wherein said lens cells are slidably fitted, a cam support tube rotationally carried concentrically on said body tube, said main support tube having formed at each end thereof a bearing seat wherein said cam support tube is concentrically located and rotatably mounted thereto, a cam sleeve nominally of cylindrical form fixed to the interior of said cam support tube intermediate of the ends thereof and solely carried thereby, said sleeve being formed from moldable plastic material and having cam surfaces formed on the opposite ends thereof, a pair of parallel spaced longitudinal surfaces forming a longitudinal slot in the wall of said support tube in the vicinity of each of said lens cells, a cam follower formed on each said cell and projecting radially through each said respective slot into contact with one of said cam surfaces, and first and second spring means biased against said two relatively movable lens cells urging said cells toward each other whereby the respective cam followers are yieldably urged against the respective cam surfaces.

References Cited

UNITED STATES PATENTS 2,533,371  12/1950  Heine _____ 350—187
2,662,443  12/1953  Loeck _____ 350—187

DAVID SCHONBERG, Primary Examiner.

M. J. TOKAR, Assistant Examiner.